United States Patent
Sandberg et al.

(10) Patent No.: US 7,411,137 B2
(45) Date of Patent: Aug. 12, 2008

(54) AUTOMATIC SEALING ARRANGEMENT FOR WEIGH SCALE FOR FOOD PROCESSING APPARATUS

(75) Inventors: Glenn Sandberg, New Lennox, IL (US); David Hansen, Orland Park, IL (US)

(73) Assignee: Formax, Inc., Mokena, IL (US)

( * ) Notice: Subject to any disclaimer, the term of this patent is extended or adjusted under 35 U.S.C. 154(b) by 15 days.

(21) Appl. No.: 11/454,143

(22) Filed: Jun. 15, 2006

(65) Prior Publication Data

US 2007/0089581 A1    Apr. 26, 2007

Related U.S. Application Data

(60) Provisional application No. 60/729,957, filed on Oct. 25, 2005.

(51) Int. Cl.
*G01G 23/02* (2006.01)
(52) U.S. Cl. .................................................. 177/154
(58) Field of Classification Search ......... 177/154–159, 177/238–244
See application file for complete search history.

(56) References Cited

U.S. PATENT DOCUMENTS

| | | | |
|---|---|---|---|
| 3,089,519 A | 5/1963 | Bradley | |
| 3,433,316 A | 3/1969 | Newman | |
| 3,444,943 A * | 5/1969 | Tytus | 177/180 |
| 3,633,696 A | 1/1972 | Kleysteuber | |
| 3,889,529 A | 6/1975 | Bradley | |
| 4,673,048 A | 6/1987 | Curran | |
| 4,884,645 A * | 12/1989 | Knothe et al. | 177/180 |
| 5,583,322 A * | 12/1996 | Leisinger et al. | 177/180 |
| 5,628,237 A | 5/1997 | Lindee et al. | |
| 5,649,463 A | 7/1997 | Lindee et al. | |
| 5,704,265 A | 1/1998 | Johnson et al. | |
| 5,724,874 A | 3/1998 | Lindee et al. | |
| 6,329,611 B1 * | 12/2001 | Abe et al. | 177/124 |
| 6,484,615 B2 | 11/2002 | Lindee | |
| 6,600,112 B2 | 7/2003 | Iseli | |

* cited by examiner

*Primary Examiner*—Randy W Gibson
(74) *Attorney, Agent, or Firm*—The Law Office of Randall T. Erickson, P.C.

(57) ABSTRACT

A sealing arrangement is provided for a product weigh scale for a food processing apparatus the weigh scale including a support for supporting a product, a member that carries the support, and a weight sensor that senses vertical load on the member. The sealing arrangement includes a seal surrounding the member beneath the support, the seal having a first sealing surface configured to be sealed against a cabinet, and a second sealing surface. The seal is movable between an inactive position wherein the second sealing surface is out of contact with the support and a sealing position wherein the second sealing surface seals against the support. The seal includes a stationary part having the first sealing surface and a sliding part having the second sealing surface. A plurality of springs urge the sliding part toward the sealing position and a source of pressurized fluid is injected between the sliding part and the stationary part to urge the sliding part toward the inactive position. The pressurized fluid has a sufficient pressure to overcome the urging of the springs and maintains the sliding part in the inactive position during normal operation of the scale, wherein upon loss of the supply of pressurized fluid, the springs cause the sliding part to assume the sealing position.

23 Claims, 7 Drawing Sheets

AUTOMATIC SEALING ARRANGEMENT FOR WEIGH SCALE FOR FOOD PROCESSING APPARATUS

This application claims the benefit of U.S. Provisional Application Ser. No. 60/729,957 filed Oct. 25, 2005.

TECHNICAL FIELD OF THE INVENTION

The present invention is directed to a sealing arrangement weigh scale for a food processing apparatus that requires a seal between an upper portion of the weigh scale that is exposed to food material and a lower portion of the weigh scale that is not intended to be exposed to food material.

BACKGROUND OF THE INVENTION

Food loaves come in a variety of shapes (round, square, rectangular, oval, etc.), cross-sections, and lengths. Such loaves are made from various comestibles, such as meat, cheese, etc. Most loaves are provided to an intermediate processor who slices and packages the products in groups for retail. The groups are precisely weighed before packaging.

A variety of machines have been developed to slice such loaves. Such machines include the FX180™ and the FX Plus™ available from Formax, Inc., of Mokena, Ill., USA. The aforementioned machines are high speed food loaf slicing machines that slice one, two, or more food loaves simultaneously using one cyclically driven slicing blade.

In the aforementioned machines, the food loaf slices are received in groups of predetermined weight on a receiving conveyor that is disposed adjacent the slicing blade. The receiving conveyor receives the slices as they are cut by the slicing blade. In many instances, neatly aligned stacked groups are preferred and, as such, the sliced product is stacked on the receiving conveyor. In other instances, the groups are shingled so that a purchaser can see a part of every slice through a transparent package. In these other instances, conveyor belts of the receiving conveyor are gradually moved during the slicing process to separate the slices. The stacked or shingled slices are transferred from the receiving conveyor onto a deceleration conveyor, and then transferred onto a weigh scale conveyor.

FIG. 1 illustrates a prior art food loaf slicing machine 50 in detail. The slicing machine can be a high speed slicing machine such as disclosed in U.S. Pat. Nos. 6,484,615; 5,628,237; 5,649,463; 5,704,265; 5,724,874; herein incorporated by reference.

Slicing machine 50 comprises a base 51 that is mounted upon four fixed pedestals or feet 52 (three of the feet 52 appear in FIG. 1) and has a housing or enclosure 53 surmounted by a top base 58. Base 51 typically affords an enclosure for a computer 54, a low voltage supply 55, a high voltage supply 56, and at least one scale mechanism 57. Base enclosure 53 may also include a pneumatic supply or a hydraulic supply, or both (not shown).

The slicing machine 50 may include a conveyor drive 61 utilized to drive an output conveyor/classifier system 64.

The slicing machine 50 of the illustrated embodiment further includes a computer display touch screen 69 in a cabinet 67 that is pivotally mounted on and supported by a support 68. Support 68 is affixed to and projects outwardly from a member 74 that constitutes a front part of the housing of slicing station 66.

Referring first to conveyor/classifier system 64 at the left-hand (output) end of slicing machine 50, the system 64 includes an inner stacking or receiving conveyor (not shown) located immediately below slicing station 66. The receiving conveyor is sometimes called a "jump" conveyor. From the jump conveyor groups of food loaf slices, stacked or shingled, are transferred to a decelerating conveyor 131 and then to a weighing or scale conveyor 132. From the scale conveyor 132 groups of food loaf slices move on to an outer classifier conveyor 134. On the far side of slicing machine 50 the sequence is substantially the same.

Machine 50 produces a series of stacks 92 of food loaf slices that are fed outwardly of the machine, in the direction of the arrow A, by conveyor classifier system 64. For a dual loaf slicing machine, the machine 50 also produces a series of stacks 93 of food loaf slices that move outwardly of the machine on its output conveyor system 64 in the direction of arrow A.

A loaf feed mechanism 75 drives the loaves into the slicing station 66 where they are sliced by a rotating knife blade. The thickness and total weight of the slices are controlled by the computer 54 which actuates various mechanical components associated with the slicing operation. The slicing thickness and total weight for each sliced group are programmed though the touch screen 67 which interfaces with the computer 54. As the blade slices the loaves, the slices are deposited on the jump conveyor where the proper numbers of slices are either stacked or shingled. The jump conveyor then drives the slice groups to the deceleration conveyor 131.

FIG. 2 shows a weigh scale arrangement 57 of the prior art. For the machine 50 described in FIG. 1, two scale arrangements 57, side-by-side would be used, one for each series of stacks 92, 93. The operation of the scale arrangement and a conveyor/classifier system for a high speed slicing machine is described in detail in U.S. Pat. No. 5,704,265, herein incorporated by reference.

The scale includes a plurality of grids or fins 206 that are arranged in parallel with each one interspersed between adjacent belts 208 of the conveyor 212. The grids 206 are connected to a plate 232 which is connected to a rod 238 by a fastener 237 extending through the rod 238 and threaded into a threaded bore 239 of the rod 238. Alignment pins 207 are used to ensure a single reattachment orientation of the plate 232 to the rod 238. The rod 238 is connected to a load cell 242 by a long fastener 244 countersunk in the bore 239. The load cell 242 is located beneath the top base 58 of the slicing machine cabinetry. Once a stack or draft of cuts slices 218 is positioned above the grids 206, the conveyor 212 is lowered (as shown for example in FIG. 4) by a pneumatic actuator 226 wherein the grids 206 extend upwardly of the belts 208 and assumed support of the draft 218. The weight of the draft 218 is transferred through the grids 206 and rod 238 to the load cell 242. A weight measurement signal is sent by the load cell to machine control.

It is important that food material not enter into the machine cabinetry beneath the top panel. The machinery inside the cabinetry is not routinely sanitized and is more difficult to sanitize. The rod penetrates through the top base 58 of the machine cabinetry. An effective seal between the rod 238 and the top base 58 is required. However, to ensure accurate weight measurements, the rod 238, and parts connected to the rod, cannot touch the slicing machine cabinetry and thus cannot be sealed in a contacting manner to the top base 58, i.e., the rod 238 must have zero friction vertical movement.

Between the plate 232 and the rod 238 is a shroud 240 that over fits a cover 241. The cover 241 is drawn tightly against the top base 58 by a lock ring 253 threaded onto an open bottom end of the cover 241.

Within the cover 241 is an annular cap 255 mounted to the rod 238 that extends over an opening 257 of a drip pan 259.

The drip pan 259 is mounted to an underside of the top base 58. Any liquid collected in the drip pan 259 is directed to a drain outlet 261 and thereafter by tubing to a drain outside of the machine cabinetry.

Thus, to provide a sealing of the penetration of the rod 238 through the top base 58, the shroud 240 helps to prevent spray from entering the cover 241. The cap 255 helps to prevent any spray that enters the cover 241 from entering the central opening 257 of the drip pan 259. Any spray deflected by the cap 255 is intended to collect in the drip pan 259 and be removed to a drain. The shroud 240 and cap 255 move vertically with the rod 238 but do not touch the cover 241 or the drip pan 259 which are fixed to the top base 58 of the slicing machine cabinetry.

In the meat slicing facility, portions of the slicing machine 50 above the top base 58 that are exposed to meat and spray are typically dismantled for a thorough cleaning and sanitizing with water and sanitizer every day (or sometimes more often during the day). Often times the slicing machine will also be cleaned or rinsed off during daily production between thorough cleanings and sanitizing.

FIG. 3 shows the scale arrangement configured for the thorough cleanings. The grids 206 and plate 232 are removed for separate cleaning, by removal of the fastener 237. A temporary closure 260 is threaded onto the rod 238 using a hand screw 264. The closure 260 includes a seal element 266 that seals against the scale cover 241. Once in place, the temporary closure is effective in preventing any wash water, food particles and sanitizer from penetrating beneath the top base 58.

However, it is possible that a sanitizing worker forgets, or disregards putting the temporary closure 260 in place for the thorough cleaning. Also, for mid-day rinsing or cleaning, between thorough cleanings, no temporary closure is usually installed. As can be seen, without the temporary closure in place, water, sanitizer and potentially meat products have a direct path "P" into the slicing machine cabinet beneath the top base 58. Alternatively, without the temporary closure in place water, sanitizer and potentially meat products have a direct path "Q" into the slicing machine cabinet beneath the top base 58 by overflowing the drip pan 259.

The present inventors have recognized that it would be desirable to improve the operability, cost and sanitation of weigh scales for food product production.

SUMMARY OF THE INVENTION

The present invention provides a sealing arrangement for a weigh scale mounted to food processing equipment, wherein the weigh scale includes a food supporting portion outside cabinetry of the food processing equipment and measuring components inside the cabinetry of the food processing equipment. The sealing arrangement provides a substantially sealed integrity between the weigh scale and the cabinetry during operation of the weigh scale and also provides a substantially sealed integrity when the upper portions of the weigh scale are removed for thorough cleaning and sanitizing.

The preferred embodiment sealing arrangement is configured to exert no contact force on moving weigh scale components during operation of the weigh scale.

The preferred embodiment weigh scale of the invention provides a compact arrangement that eliminates the need for a drip pan assembly within the cabinetry.

The preferred embodiment weigh scale of the invention includes seal elements that are configured to reliably, automatically assume a sealed configuration when power is interrupted to the food processing equipment or during cycle stops.

The preferred embodiment sealing arrangement of the invention utilizes a directional valve and compressed air, to hold a spring loaded sealing element depressed in an operating configuration. During a power failure, or during clean-up when the power is normally turned off, air pressure will decrease and the seal will automatically close by spring force.

Normal cycle stop will also close the seal through the directional valve. This is a particular improvement over the current method during any mid-day rinsing or cleaning, as no cover is typically installed according to the current method.

According to the preferred embodiment of the invention, the weigh scale is incorporated into a slicing machine, however, the invention also encompasses weigh scales for other types of food processing equipment.

According to a preferred embodiment, the invention provides a weigh scale, a cabinet, a support, a rod, a weigh sensor, a seal and a means for moving the seal. The support supports a product to be weighed. The rod carries the support and penetrates the cabinet. The weight sensor supports the rod, and is located within the cabinet. The seal surrounds the rod beneath the support, the seal movable between an inactive position out of contact with the support and a sealing position to seal the support to the cabinet. The means for moving the seal moves the seal from the inactive position to the sealing position.

According to the preferred embodiment, the seal comprises a stationary part sealed to the cabinet and a sliding part. The sliding part is slidably movable with respect to the stationary part and sealed thereto in the sealing position. The means slides the sliding part between the inactive position and the sealing position.

According to the preferred embodiment, the means comprises a plurality of springs that urge the sliding part toward the sealing position. A source of pressurized fluid is injected between the sliding part and the stationary part to urge the sliding part toward the stationary part. The pressurized fluid has a sufficient pressure to overcome the urging of the springs and maintains the sliding part in the inactive position during normal operation of the scale. Upon loss of the supply of pressurized fluid, the springs cause the sliding part to assume the sealing position.

According to the preferred embodiment, the stationary part comprises an outer cover and an outer surrounding seal element. The outer surrounding seal element is sealed to the sliding part. The sliding part comprises a base flange, wherein pressurized fluid between the outer surrounding seal element and the base flange urges the sliding part toward the inactive position.

According to the preferred embodiment, the support comprises a top flange and the sliding part seals against the top flange.

According to the preferred embodiment, the support comprises fins arranged in parallel on the top flange.

According to the preferred embodiment the outer surrounding seal element and the cover are threadingly engaged.

According to the preferred embodiment the outer surrounding seal element includes a central opening and wherein the sliding part extends through the central opening and is sealed within the central opening for sliding movement therein.

According to another aspect of the invention, a sealing arrangement for a weigh scale is provided that comprises a support for supporting a product, a member that carries the support, and a weight sensor that senses vertical load on the member. The sealing arrangement includes a seal surrounding the member beneath the support, the seal having a first sealing surface configured to be sealed against a cabinet, and a second sealing surface. The seal is movable between an inactive position wherein the second sealing surface is out of contact with the support and a sealing position wherein the second sealing surface seals against the support. The arrangement includes at least one spring that urges the seal into the sealing position.

According to a preferred embodiment, a pneumatic means urges the seal into the inactive position by overcoming force from the spring.

According to the preferred embodiment, the seal comprises a stationary part having the first sealing surface and a sliding part having the second sealing surface. The sliding part is slidably movable with respect to the stationary part and sealed thereto in the sealing position.

According to the preferred embodiment, the at least one spring comprises a plurality of springs that urge the sliding part toward the sealing position and a source of pressurized fluid injected between the sliding part and the stationary part to urge the sliding part toward the stationary part. The pressurized fluid has a sufficient pressure to overcome the urging of the springs and maintains the sliding part in the inactive position during normal operation of the scale, wherein upon loss of the supply of pressurized fluid, the springs cause the sliding part to assume the sealing position.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENT

Figure 1:
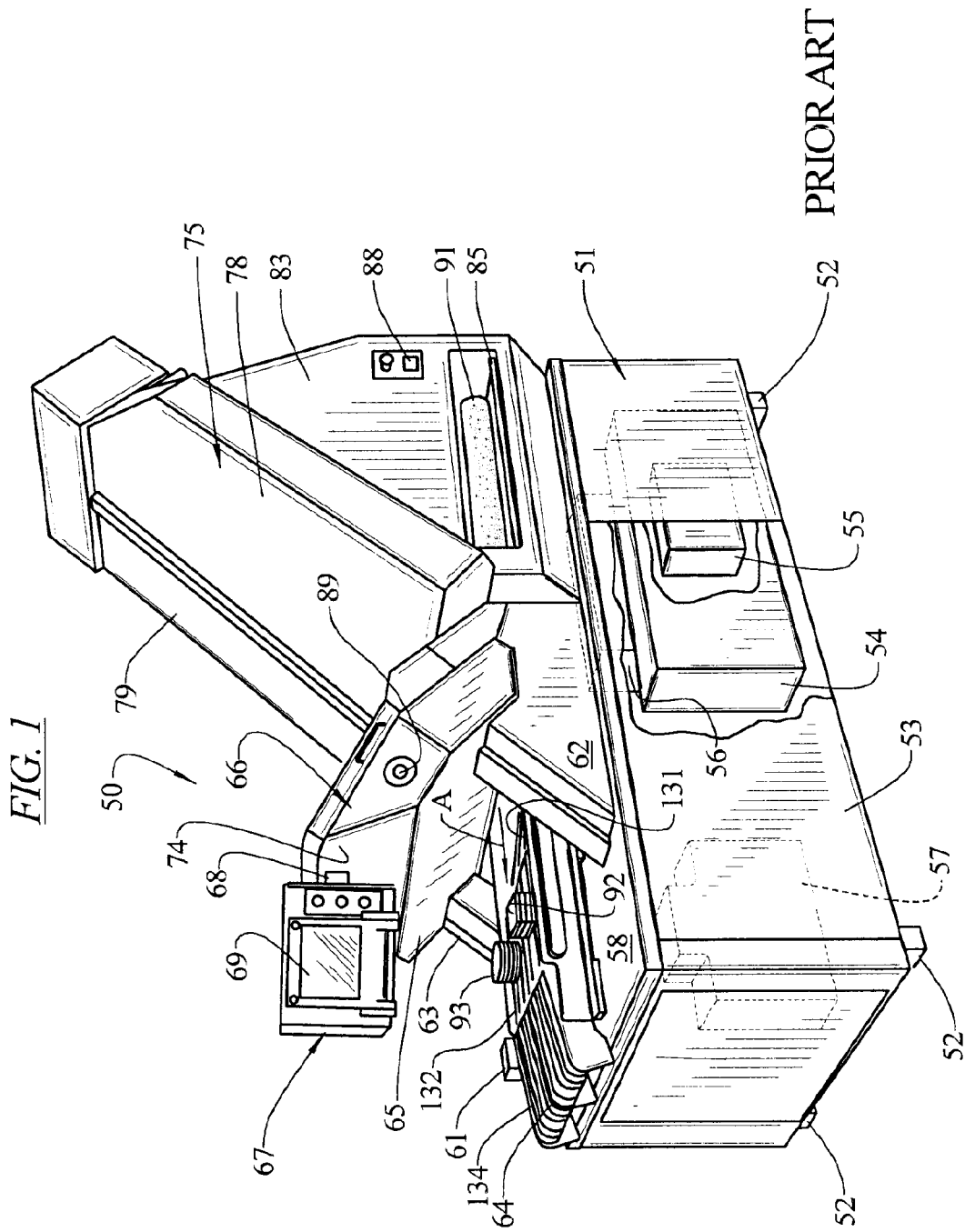
FIG. 1 a perspective view of a prior art slicing apparatus.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 4:
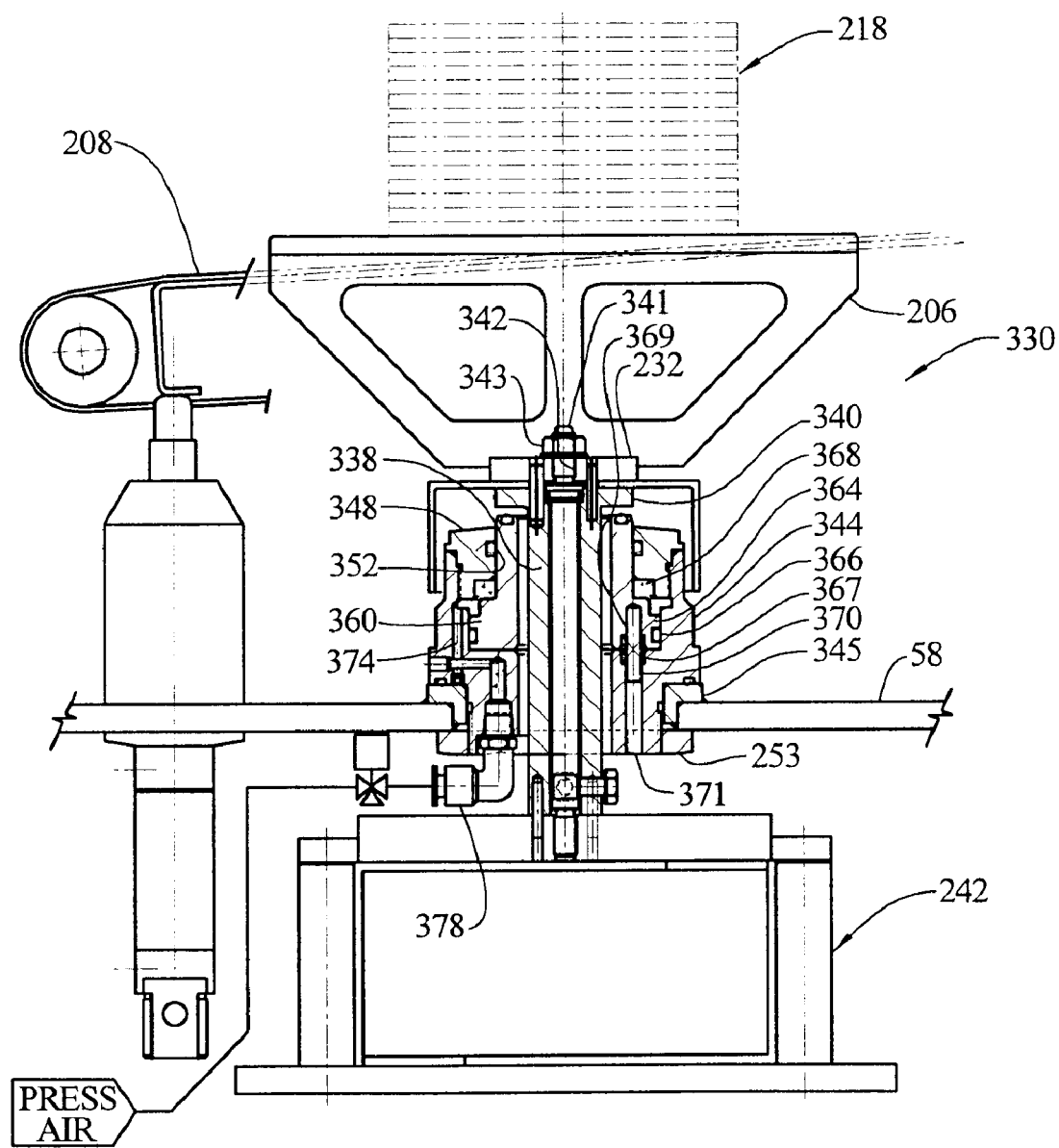
FIG. 4 is a diagrammatic sectional view of a preferred embodiment scale arrangement according to the invention, in an operational mode with a load on the scale.
Figure 5:
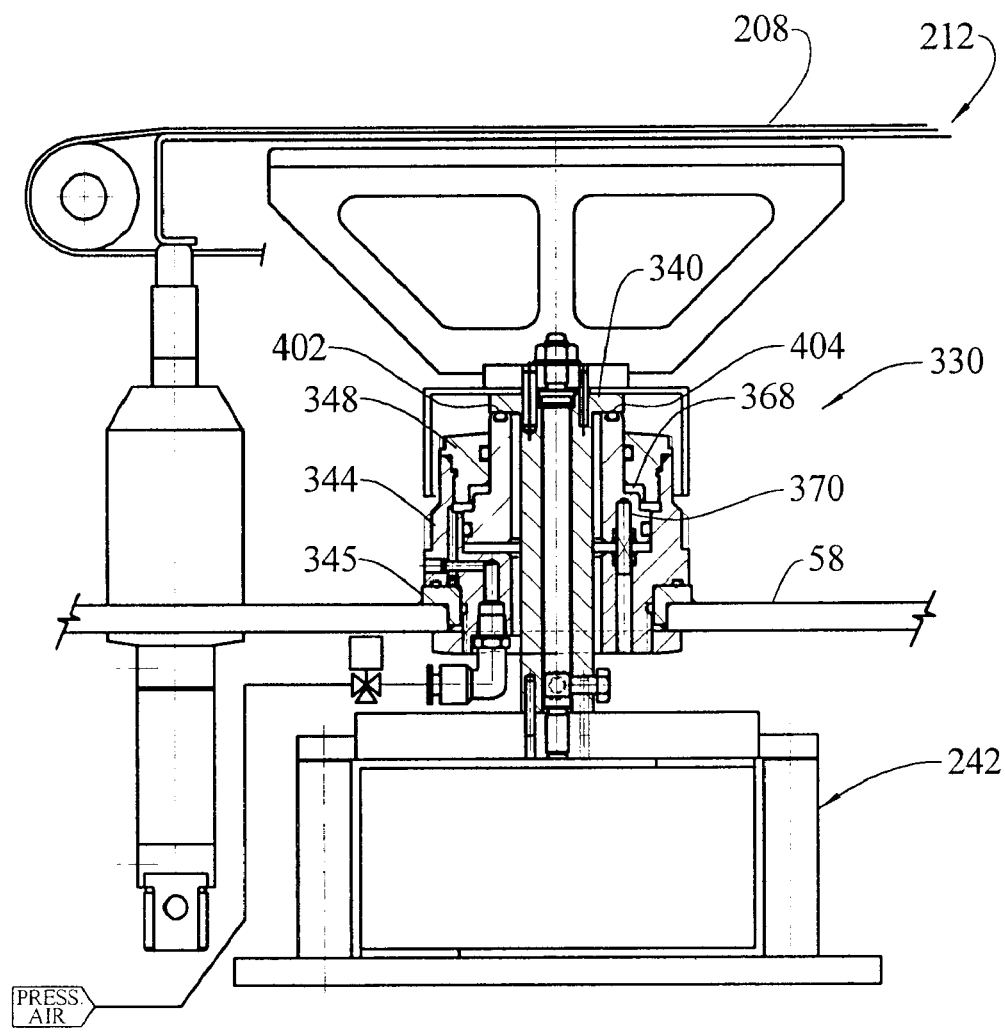
FIG. 5 is a diagrammatic sectional view of the scale arrangement of FIG. 4 in operational mode with no load on the scale.
Figure 6:
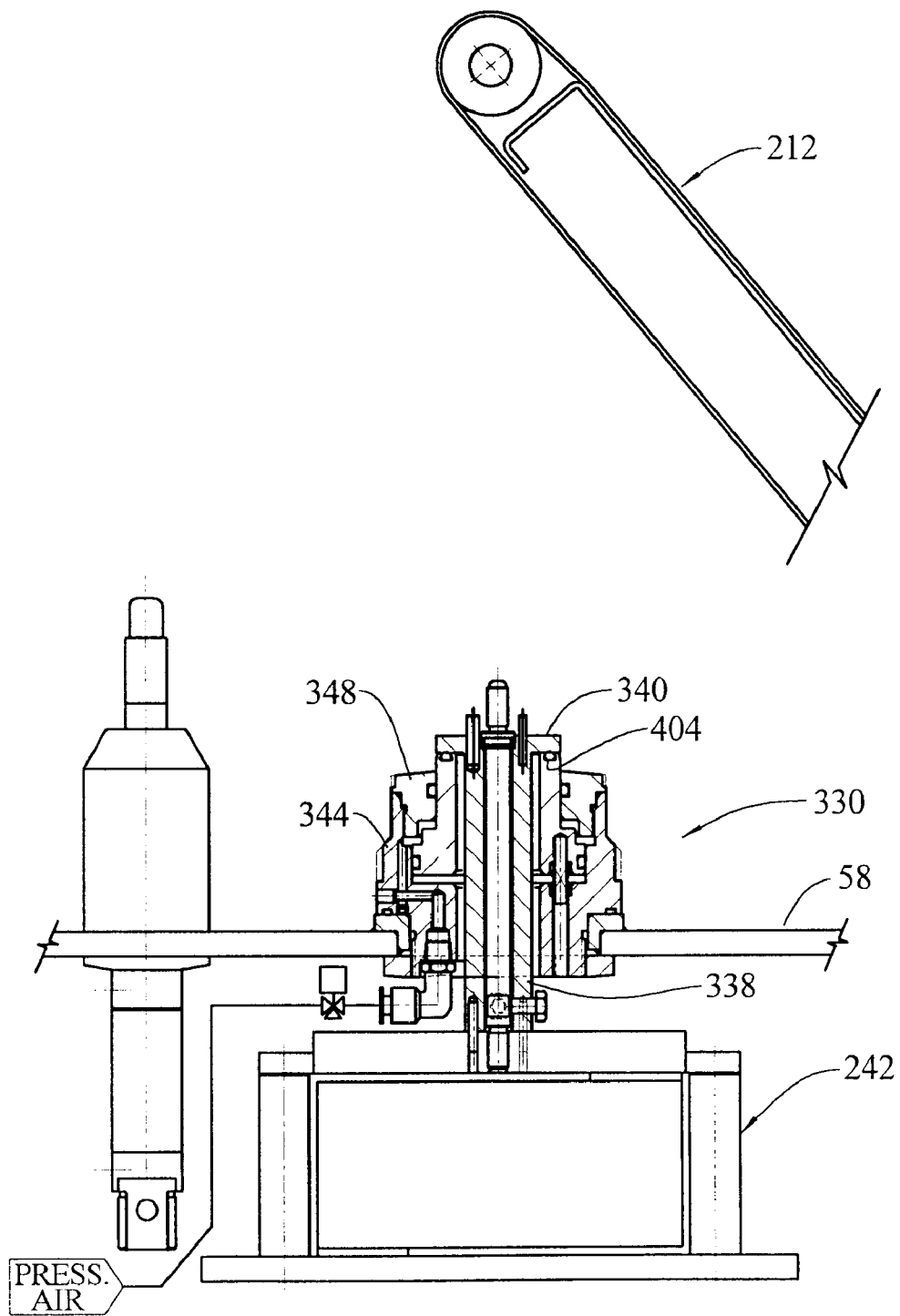
FIG. 6 is a diagrammatic sectional view of the scale arrangement of FIG. 4 in a non-operational, thorough cleanup mode.

FIGS. 4-6 illustrate an improved scale arrangement 330 of the preferred embodiment of the invention, to be incorporated into food processing equipment, such as the slicing machines disclosed in U.S. Pat. Nos. 6,484,615; 5,628,237; 5,649,463; 5,704,265; 5,724,874; herein incorporated by reference.

Figure 2:
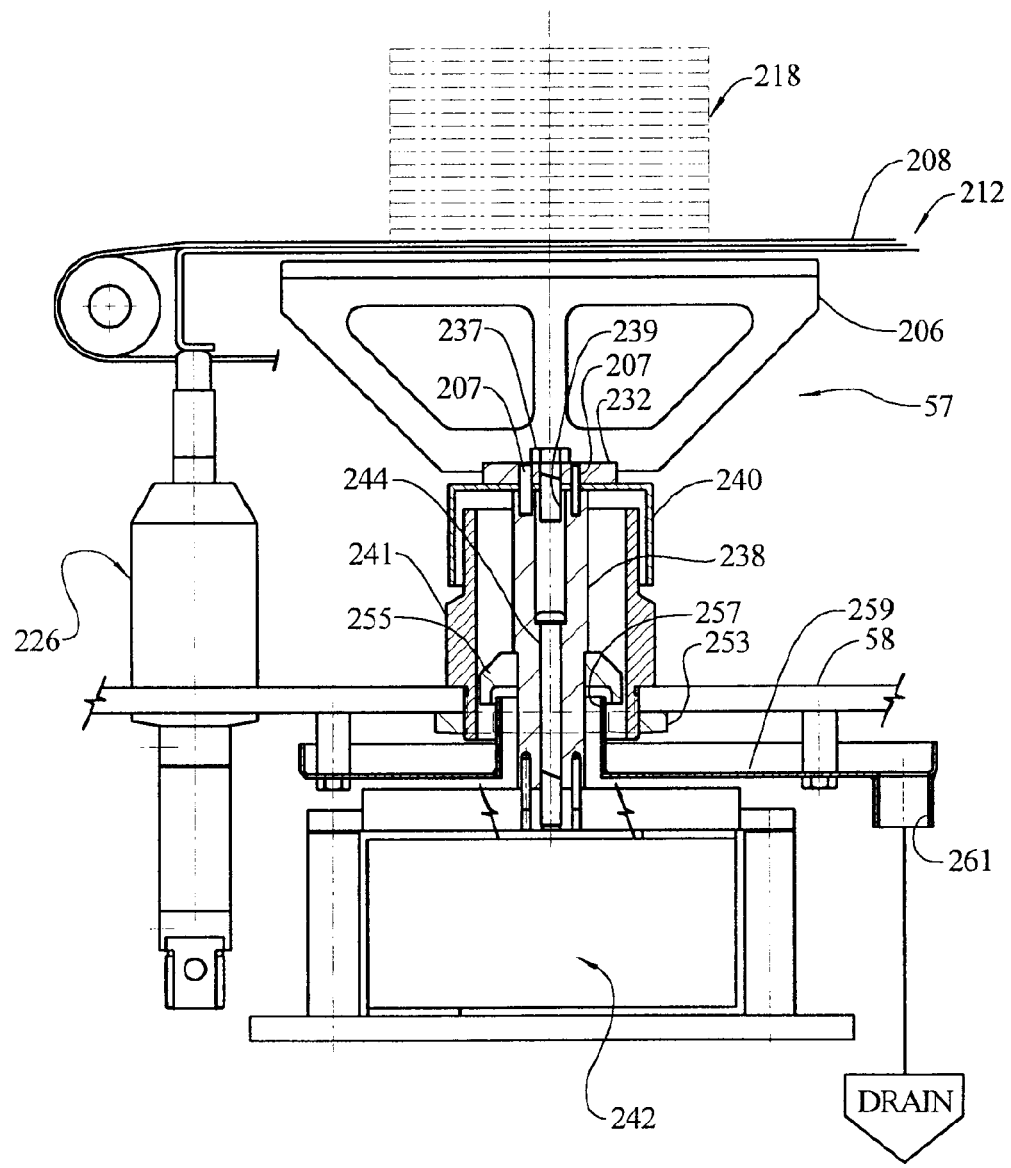
FIG. 2 is a diagrammatic sectional view of a prior art scale arrangement in an operational mode, but with no load on the scale.
Figure 3:
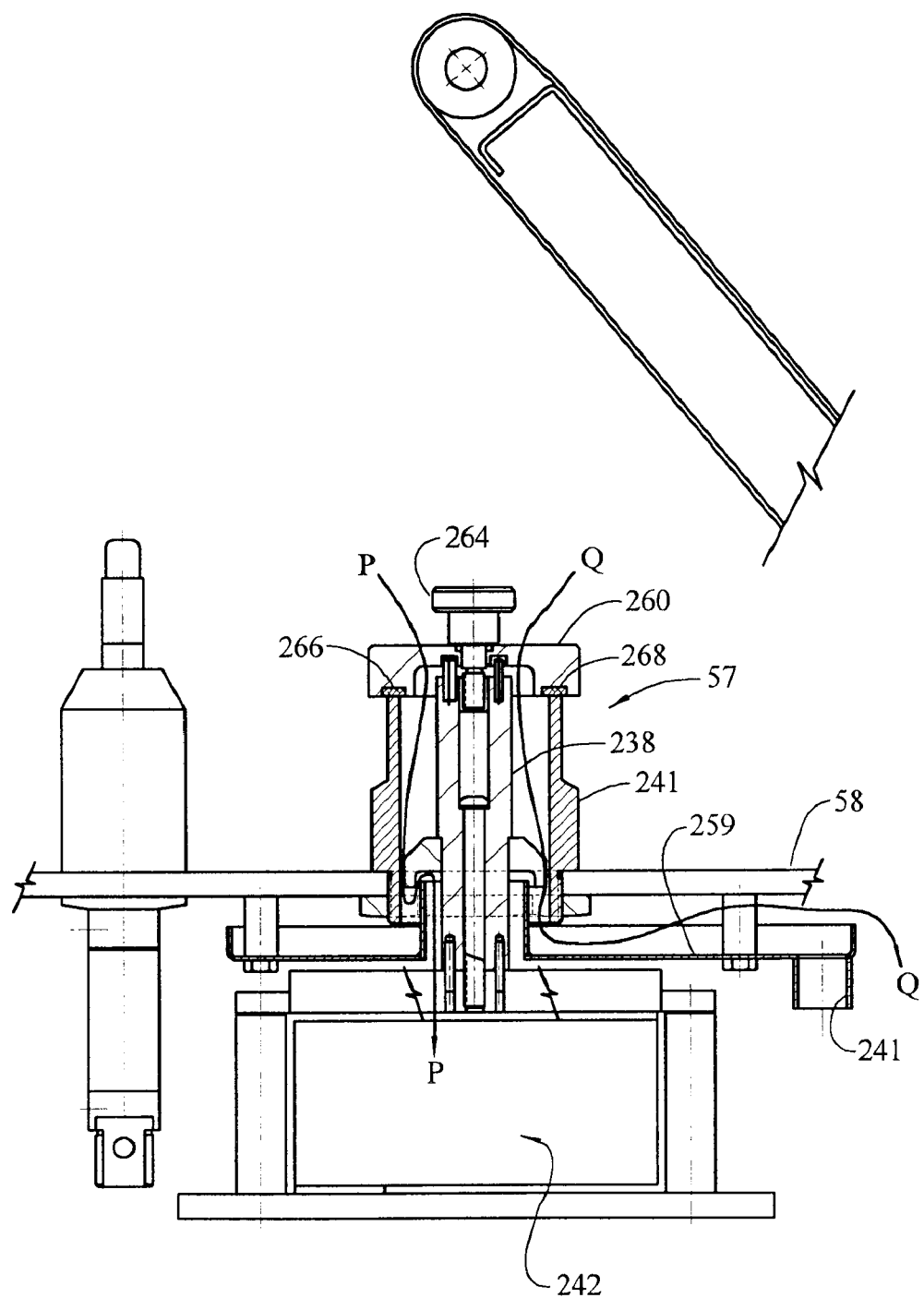
FIG. 3 is a diagrammatic sectional view of the prior art scale arrangement of FIG. 2 in a non-operational, thorough cleanup mode.

The improved scale arrangement shares some similar parts as the scale arrangement shown in FIGS. 2 and 3, and similar parts are given the same reference numbers.

According to the embodiment shown in FIGS. 4-6, a modified rod 338 includes a top annular flange 340. A long stud 341 penetrates through a center bore 335 of the rod 338 and is threaded into the load cell 242. The mounting plate 232 is fastened to the rod 338 by a hole 342 receiving the stud 341 and a nut 343 threaded onto the stud 341. The stud 341 includes an annular collar 337 that channels an O-ring 347 for sealing against the bore 335 of the rod 338.

An outer cover 344 is sealed to the top base 58. A seal ring 345 seals against the cover 344 and a top base 58. The lock ring 253 is threaded onto an outside of the cover beneath the top base 58 to clamp the cover 344 and seal ring 345 against the top base 58.

An outer annular seal element 348 is sealingly threaded inside an open end of the cover 344. The outer annular seal element 348 includes an O-ring seal 352 on an inside surface thereof. An inner, cylindrical seal element 360 is slidingly sealed by the O-ring seal 352 to the outer annular seal element 348. The seal element 360 includes a base flange 364 having an O-ring seal 366 to seal against the cover 344.

A plurality of springs 367 (one shown), preferably six, are arranged spaced around a circular pattern within the flange perimeter, and compressed between the cover 344 and the base flange 364. The springs 367 are compressed to urge the cylindrical seal element 360 upwardly. The springs 367 each surround a pin 370 that is fixed into a bore 369 in the flange 364, the pin being guided in a collinear bore 371 in the cover 344. Ends of the springs 367 are journalled in countersunk bores 369a, 371a, of the bores 369, 371.

A stepped annular air channel 368 is formed between a bottom of the outer seal element 348 and a top of the flange 364. An air inlet channel 374 is formed axially through the cover 344 and has an upper end that is open into the annular channel 368. An air quick connect coupling 378 is connected to the channel 374. Pressurized air is connected to the coupling 378 via an electrical solenoid valve 379.

When pressurized air is communicated to the annular channel 368 via the axial channel 374, the force of the pressurized air against the flange 364 urges the cylindrical seal element 360 downwardly, overcoming the upward force of the springs 370. In this configuration, the rod 338 is free to move vertically during a weighing operation without any contact from the cylindrical seal element 360.

Figure 4A:
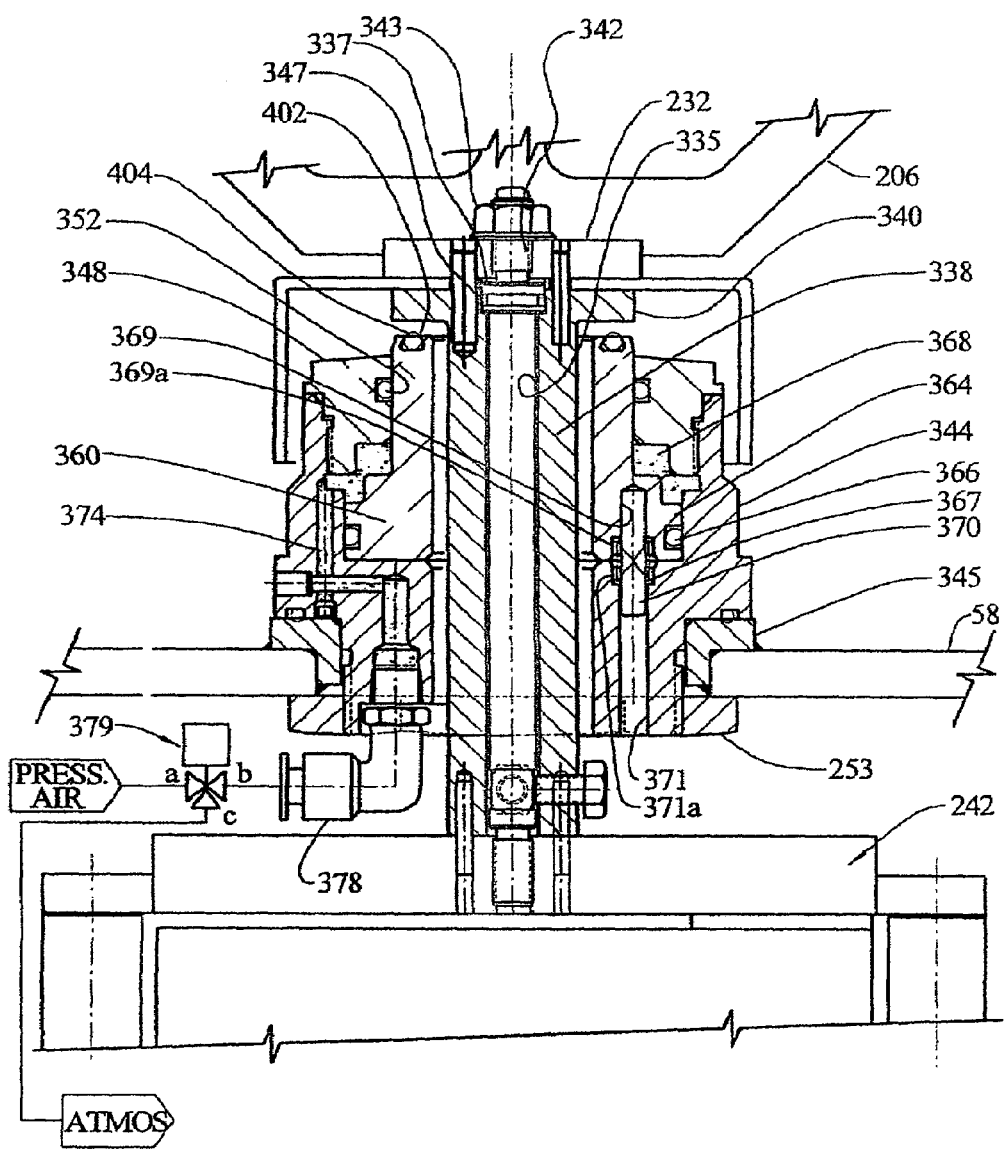
FIG. 4A is a fragmentary, enlarged view taken from FIG. 4.

As shown in FIG. 4A, the solenoid valve 379 includes three ports a, b, c. When the solenoid valve is electrically energized during normal operation, the port a is open through the valve to the port b and pressurized air can flow to the coupling and into the channels 374, 368. During a power outage, such as during a thorough cleanup, the valve 379 is de-energized and a spring in the solenoid valve causes a valve element to shift within the solenoid valve 379 such that the port b is open to the port c and pressurized air within the channels 368, 374 can bleed to atmosphere. The solenoid is also signal-connected to machine control such that when the machine is switched to cycle stop, the solenoid is also de-energized and the port b is open to the port c and pressurized air within the channels 368, 374 can bleed to atmosphere.

FIG. 5 illustrates the scale arrangement during a loss of air pressure. During this occurrence, the air pressure in the annular channel 368 decreases to the point that the upward force of the springs 370 urges the cylindrical seal element 360 upwardly until a top surface 402, which holds a protruding O-ring 404, sealingly presses against a bottom side of the rod flange 340. A seal is formed around the rod, including the inner cylindrical seal element 360, the outer seal element 348, the cover 344 and the seal ring 345 that seals to the top base 58.

FIG. 6 illustrates the configuration of the elements during a thorough cleanup operation wherein power is disconnected and air pressure to the coupling decreases. The grids 206 and a plate 232 are removed for cleaning. The remaining elements shown are positioned as described above with regard to FIG. 5. No temporary cover is required. The sealed integrity of the top base 58 is maintained.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

The invention claimed is:

1. A weigh scale, comprising:
a cabinet;
a support for supporting a product;
a rod that carries said support and penetrates said cabinet;
a weight sensor supporting said rod, and located within said cabinet;
a seal surrounding said rod beneath said support, said seal movable between an inactive position out of contact with said support and a sealing position to seal said support to said cabinet; and
a means for moving said seal from said inactive position to said sealing position;
said seal comprises a stationary part attached to said cabinet and a sliding part, said sliding part slidably movable with respect to said stationary part and sealed thereto in said sealing position, wherein said means slides said sliding part between said inactive position and said sealing position.

2. The weigh scale according to claim 1, wherein said means comprises a plurality of springs that urge said sliding part toward said sealing position and a source of pressurized fluid injected between said sliding part and said stationary part to urge said sliding part toward said stationary part, said pressurized fluid having a sufficient pressure to overcome the urging of said springs and maintains said sliding part in the inactive position during normal operation of said scale, wherein upon loss of said supply of pressurized fluid, said springs cause said sliding part to assume said sealing position.

3. The weigh scale according to claim 2, wherein said stationary part
comprises an outer cover and an outer surrounding seal element, said outer surrounding seal element sealed to said sliding part, said sliding part comprises a base flange, wherein pressurized fluid between said outer surrounding seal element and said base flange urges said sliding part toward said inactive position.

4. The weigh scale according to claim 3, wherein said support comprises a top flange and said sliding part seals against said top flange.

5. The weigh scale according to claim 4, wherein said support comprises fins arranged in parallel on said top flange.

6. The weigh scale according to claim 3, wherein said outer surrounding seal element and said cover are threadingly engaged.

7. The weigh scale according to claim 6, wherein said outer surrounding seal element includes a central opening and wherein said sliding part extends through said central opening and is sealed within said central opening for sliding movement therein.

8. The weigh scale according to claim 3, wherein said outer surrounding seal element includes a central opening and wherein said sliding part extends through said central opening and is sealed within said central opening for sliding movement therein.

9. A sealing arrangement for a weigh scale that comprises a support for supporting a product, a member that carries said support, and a weight sensor sensing vertical load on said member, comprising:
a seal surrounding said member beneath said support, said seal having a first sealing surface configured to be sealed against a cabinet, and a second sealing surface, said seal movable between an inactive position wherein said second sealing surface is out of contact with said support and a sealing position wherein said second sealing surface seals against said support; and
at least one spring urging said seal into said sealing position.

10. The sealing arrangement according to claim 9, further comprising a pneumatic means for urging said seal into said inactive position by overcoming force from said spring.

11. The sealing arrangement according to claim 9, wherein said seal comprises a stationary part having said first sealing surface and a sliding part having said second sealing surface, said sliding part slidably movable with respect to said stationary part and sealed thereto in said sealing position.

12. The sealing arrangement according to claim 11, wherein said at least one spring comprises a plurality of springs that urge said sliding part toward said sealing position and a source of pressurized fluid injected between said sliding part and said stationary part to urge said sliding part toward said stationary part, said pressurized fluid having a sufficient pressure to overcome the urging of said springs and maintains said sliding part in the inactive position during normal operation of said scale, wherein upon loss of said supply of pressurized fluid, said springs cause said sliding part to assume said sealing position.

13. The sealing arrangement according to claim 12, wherein said stationary part comprises an outer cover and an outer surrounding seal element, said outer surrounding seal element sealed to said sliding part, said sliding part comprises a base flange, wherein pressurized fluid between said outer surrounding seal element and said base flange urges said sliding part toward said inactive position.

14. The sealing arrangement according to claim 13, wherein said support comprises a top flange and said sliding part seals against said top flange.

15. The sealing arrangement according to claim 14, wherein said support comprises fins arranged in parallel on said top flange.

16. The sealing arrangement according to claim 13, wherein said outer surrounding seal element and said cover are threadingly engaged.

17. The sealing arrangement according to claim 16, wherein said outer surrounding seal element includes a central opening and wherein said sliding part extends through said central opening and is sealed within said central opening for sliding movement therein.

18. A sealing arrangement for a weigh scale that comprises a support for supporting a product, a member that carries said support, and a weight sensor sensing vertical load on said member, said weight sensor located within a cabinet and said support located above said cabinet, said support penetrating a top of said cabinet, comprising:

a seal surrounding said member beneath said support, said seal having a first sealing surface configured to maintain a seal with said cabinet, and a second sealing surface, said seal movable between an inactive position wherein said second sealing surface is out of contact with said support and a sealing position wherein said second sealing surface seals against said support; and a pressurized fluid circuit that includes a channel operatively formed between the cabinet and the seal, said channel configured to be charged with pressurized fluid to urge said seal relative to said cabinet toward said inactive position, wherein upon loss of pressurized fluid in said channel said seal moves to said sealing position.

19. The sealing arrangement according to claim 18, further comprising at least one spring operatively arranged between said cabinet and said seal and urging said seal toward said sealing position, pressurized fluid within said channel holding said seal in said inactive position by force in opposition to force from said spring.

20. The sealing arrangement according to claim 18, wherein said seal comprises a stationary part having said first sealing surface and a sliding part having said second sealing surface, said sliding part slidably movable with respect to said stationary part and sealed thereto when said seal is in said sealing position.

21. The sealing arrangement according to claim 20, wherein said stationary part comprises an outer cover and an outer surrounding seal element, said outer surrounding seal element sealed to said sliding part, said sliding part comprises a base flange, wherein said channel is arranged between said outer surrounding seal element and said base flange to receive pressurized fluid to urge said seal toward said inactive position.

22. The sealing arrangement according to claim 21, wherein said support comprises a top flange and said sliding part seals against said top flange.

23. The sealing arrangement according to claim 21, wherein said outer surrounding seal element includes a central opening and wherein said sliding part extends through said central opening and is sealed within said central opening for sliding movement therein.

* * * * *